(12) United States Patent
Liu et al.

(10) Patent No.: US 11,556,483 B2
(45) Date of Patent: Jan. 17, 2023

(54) INFORMATION HANDLING APPARATUS AND METHOD FOR UNLOCKING A PERSISTENT REGION IN MEMORY

(71) Applicant: LENOVO ENTERPRISE SOLUTIONS (SINGAPORE) PTE. LTD., Singapore (SG)

(72) Inventors: Zhijun Liu, Shanghai (CN); Sumeet Kochar, Cary, NC (US); He Huang, Shanghai (CN); Wenguang Chen, Shanghai (CN)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 56 days.

(21) Appl. No.: 16/869,102

(22) Filed: May 7, 2020

(65) Prior Publication Data

US 2020/0409871 A1    Dec. 31, 2020

(30) Foreign Application Priority Data

Jun. 28, 2019 (CN) .......................... 201910577065.5

(51) Int. Cl.
| | |
|---|---|
| *G06F 12/14* | (2006.01) |
| *G06F 12/06* | (2006.01) |
| *G06F 13/16* | (2006.01) |
| *G06F 21/79* | (2013.01) |

(52) U.S. Cl.
CPC ...... *G06F 12/1466* (2013.01); *G06F 12/0607* (2013.01); *G06F 13/1668* (2013.01); *G06F 21/79* (2013.01)

(58) Field of Classification Search
CPC ............ G06F 12/0607; G06F 12/1466; G06F 13/1668; G06F 21/31; G06F 21/575; G06F 21/79
See application file for complete search history.

(56) References Cited

U.S. PATENT DOCUMENTS

| | | | |
|---|---|---|---|
| 7,743,241 B1 * | 6/2010 | Moore | G06F 21/45 713/2 |
| 8,695,085 B2 * | 4/2014 | Smithson | G06F 21/31 726/16 |
| 2008/0162848 A1 * | 7/2008 | Broyles | G06F 12/1433 711/163 |
| 2013/0151858 A1 * | 6/2013 | Wang | G06F 21/34 713/182 |
| 2013/0166869 A1 * | 6/2013 | Wang | G06F 21/78 711/163 |
| 2016/0328564 A1 * | 11/2016 | Vidyadhara | G06F 21/575 |
| 2019/0034620 A1 * | 1/2019 | Khatri | G06F 21/45 |

(Continued)

FOREIGN PATENT DOCUMENTS

WO    WO-2018100652 A1 *    6/2018 ............. G06F 21/60

*Primary Examiner* — Aracelis Ruiz

(57) ABSTRACT

Methods, systems, and apparatuses for unlocking a persistent region in memory are disclosed. An information handling apparatus includes a controller, a memory coupled to the controller, the memory having a persistent region that can either be locked or unlocked, and a firmware configured to determine whether the persistent region of the memory is locked, obtain a stored passphrase from a storage device if the persistent region is locked, and use the passphrase to unlock the persistent region of the memory.

17 Claims, 4 Drawing Sheets

(56) References Cited

U.S. PATENT DOCUMENTS

| | | | |
|---|---|---|---|
| 2019/0050705 A1* | 2/2019 | Kasanicky | G06F 3/0604 |
| 2019/0096489 A1* | 3/2019 | Mosiolek | G11C 5/144 |
| 2020/0026848 A1* | 1/2020 | Ukita | G06F 21/31 |
| 2020/0250346 A1* | 8/2020 | Sasidharan | G06F 12/1408 |

* cited by examiner

INFORMATION HANDLING APPARATUS AND METHOD FOR UNLOCKING A PERSISTENT REGION IN MEMORY

CROSS-REFERENCE TO RELATED APPLICATION

This application is a non-provisional application of and claims priority from Chinese Application Serial No. 201910577065.5, filed Jun. 28, 2019, the contents of which are incorporated by reference in their entirety.

FIELD OF INVENTION

The present invention relates to memory devices in computers, and in particular to management of persistent regions in the memory device.

BACKGROUND OF INVENTION

Storage technologies in modern computers have developed drastically in recent years to provide more options to the computers for storing data. For example, Non-Volatile Dual In-Line Memory Module (NVDIMM) are being deployed in servers, and are compatible in physical interface with traditional Dual In-Line Memory Module (DIMM). Some types of NVDIMM offer two different modes, namely a memory mode in which the NVDIMM works like DIMM, where data is gone when the system is powered down, and an App Direct mode in which the data remains stored even when the system is powered down. In the App Direct mode, the NVDIMM behaves therefore like a conventional persistent storage device (e.g. a hard disk drive) and contains persistent region(s) to achieve persistent data storage.

As the NVDIMM contains persistent region(s) for data storage even when the system power is shut off, a locking function is provided to the persistent region so that an unauthorized attempt to access data in the persistent region (s) will be denied just like a secured hard disk drive. If the persistent region is locked, then the operating system (OS) cannot recognize and access this locked persistent region.

However, conventionally, to allow access to a locked persistent region (i.e., to unlock it), user intervention is required to complete the unlocking process. In particular, the user has to manually provide a passphrase used to lock the persistent region in order to unlock the same at the time of the system start-up. For example, the user could do the unlocking action in the firmware of the computer first, and then boot to the operating system with the unlocked state of the persistent region. Or, the user could boot to the operating system directly and then use a special tool to unlock the persistent region in the operating system. These manual processes not only increase the labor intensity of the user, but also decrease the operation efficiency of the computer system.

SUMMARY OF INVENTION

Accordingly, the present invention, in one aspect, is a method for unlocking a persistent region in a memory of an information handling apparatus. The method comprises the steps of: configuring a firmware of the information handling apparatus to check whether the persistent region in the memory is locked or not; if the persistent region is locked, to instruct a controller to obtain a stored passphrase from a storage device; and to use the passphrase to unlock the persistent region. Preferably, the obtaining step and the using step above are performed automatically without human intervention.

In another aspect, the present invention provides an information handling apparatus, which includes a controller; a memory coupled to the controller, the memory having a persistent region that can either be locked or unlocked; and a firmware configured to check whether the persistent region in the memory is locked or not, means for obtaining a stored passphrase from a storage device if the persistent region is locked; and to use the passphrase to unlock the persistent region.

Embodiments of the present invention therefore provides a better user experience to the user of information handling apparatus in that he/she can use locked persistent regions in the NVDIMM more freely. There is no need to manually input the passphrase every time the system boots up, so the user faces less hassle in bringing the system into normal operation. As a result, the maintenance cost of the information handling apparatus can be lowered, as assistance from the service provider will be needed less often to help the user in the event of passphrase loss or unlock failure. Still, the integrity and security of the data in the persistent memory region in the memory are not compromised, as the persistent memory region is still secured so that unauthorized modification to the region can be avoided.

BRIEF DESCRIPTION OF FIGURES

The foregoing and further features of the present invention will be apparent from the following description of preferred embodiments which are provided by way of example only in connection with the accompanying figures, of which.

In the drawings, like numerals indicate like parts throughout the several embodiments described herein.

DETAILED DESCRIPTION OF THE PREFERRED EMBODIMENTS

Figure 1:
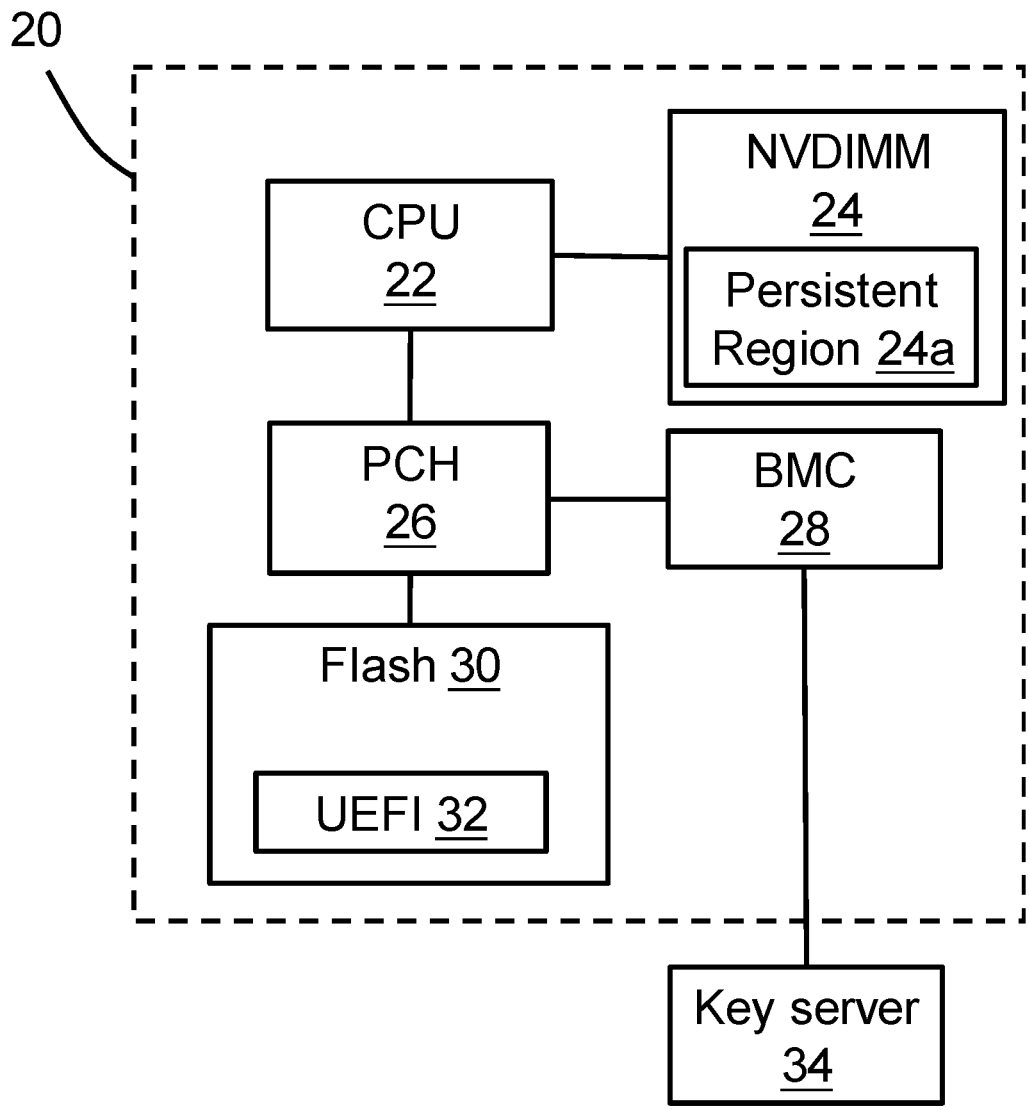
FIG. 1 sets forth an internal component block diagram of a computer device where the computer device is connected to a server, according to an embodiment of the present invention.

Turning now to FIG. 1, a first embodiment of the invention is a computer device 20 which is adapted to carry out the method of automatically unlocking a persistent region in the memory. The computer device 20 is an example of an information handling apparatus. The computer device 20 contains a CPU 22 as the main processor installed in a socket of an information handling apparatus and is connected to the Platform Control Hub (PCH) 26 and the Flash chip 30. Such configurations shown in FIG. 1 can be applied to any sort of information handling apparatus. In FIG. 1, the CPU 22 directly connects to the PCH 26 but not the Flash chip 30. Rather, the CPU 22 can only access the Flash chip 30 through the PCH 26. The PCH 26 is connected to the Flash chip 30 and also to a Baseband Management Controller (BMC) 28. BMC 28 is a service processor in the computer device 20. A NVDIMM 24 is also connected to the CPU 22 and can be accessed by the CPU 22 upon request by other components in the computer device 20 such as the operating system (not shown) and applications running on the operating system.

FIG. 1 shows that the NVDIMM 24 contains a persistent region 24a. The creation, management and deletion of a persistent region in a NVDIMM are understood by persons of skill in the art so they will not be described here in detail. As the persistent region 24a is used as a physical disk drive to persistently store data, the portions of the NVDIMM 24 used for the persistent region 24a is operated under the App Direct mode. The persistent region 24a can also be locked by a passphrase (not shown) to secure data stored therein to avoid unauthorized access, but the persistent region 24a can also be unlocked using the passphrase by a user of the computer device 20 or a computer program such as the Unified Extensible Firmware Interface (UEFI) 32 which is stored in a memory (shown as the Flash chip 30 in FIG. 1) of the computer device 20. As those skilled in the art will understand, UEFI 32 acts as a firmware interface in the computer device 20 between the operating system and platform hardware.

As shown in FIG. 1, the BMC 28 is further connected to a key server 34 that is external to the computer device 20 and is connected to the computer device 20 via a communication network (not shown). The computer device 20 contains a network adapter (not shown) as the component for the BMC 28 to connect to the key server 34. The connection of BMC to an external device via network will be understood by skilled persons in the art. The key server 34 can be a local server (e.g. connected in a local area network) or a remote server (e.g. connected via Internet), and the key server 34 has data storage capability.

Figure 2:
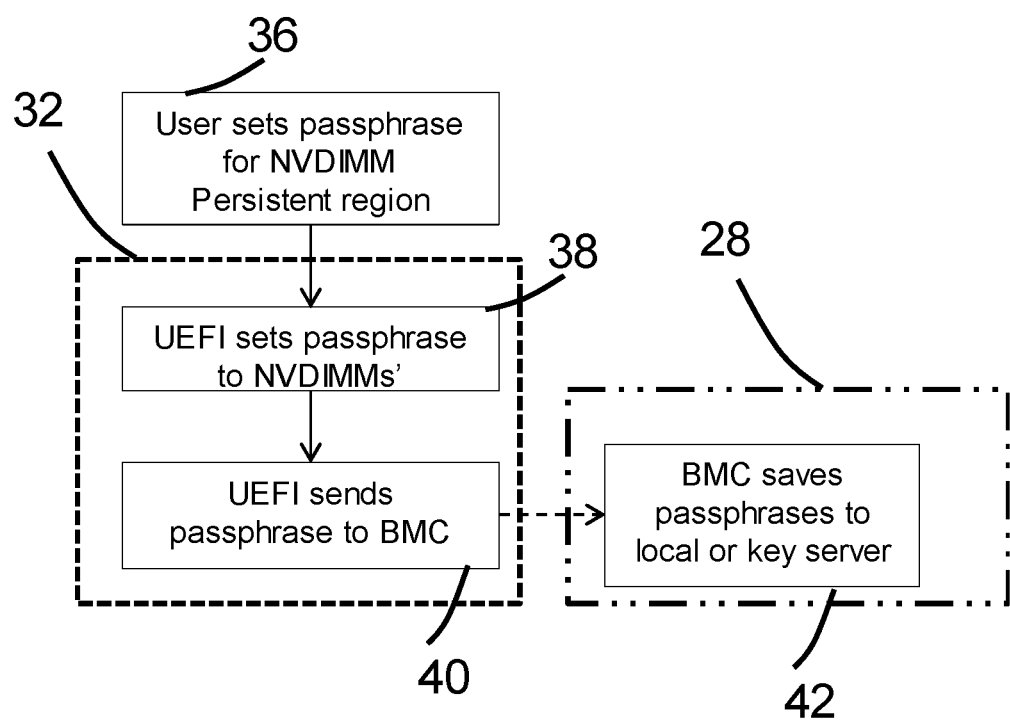
FIG. 2 sets forth a flowchart illustrating an exemplary method of storing a passphrase for a locked persistent region by a baseband management controller of a computer device according to an embodiment of the present invention.

Next, FIG. 2 shows, according to another embodiment of the invention, a procedure of storing a passphrase for a locked persistent region in a memory (such as NVDIMM) of an information handling apparatus. By way of example, the method shown in FIG. 2 is performed on the computer device shown in FIG. 1, but is not limited to only to such a computer device. For the ease of description, the computer device 20 in FIG. 1 will be referenced to describe an exemplary implementation of the method of FIG. 2. Assuming that a persistent region 24a is created in the NVDIMM 24 of the computer device 20, then a passphrase for locking the persistent region 24a should be inputted by the user in Step 36. The user for example inputs the passphrase at an interface of the UEFI 32 by using a keyboard (not shown) or a touch screen (not shown) being part of or connected to the computer device 20.

After the user has inputted the passphrase to the computer device 20, the UEFI 32 in Step 38 then sets the passphrase to the persistent region 24a of the NVDIMM 24. In other words, the passphrase is applied to the persistent region 24a to lock it, after which data stored in the persistent region 24a will not be accessible to external devices unless the correct passphrase can be provided. Afterwards, in Step 40, the UEFI 32 sends the passphrase to BMC 28 for storing the passphrase. In this embodiment, the passphrase will be saved on the key server 34, so in Step 42 the BMC 28 performs this saving action and a result the passphrase is saved on the key server 34 for future use (as will be described below). Note that the dash-line box with the numeral 32 in FIGS. 2-3 indicates that steps in within the box are performed by the UEFI 32. Likewise, the dash-line box with the numeral 28 in FIGS. 2-3 indicates that steps in within the box are performed by the BMC 32. In this embodiment, the passphrase is stored in an external device (i.e. the key server 34) rather than the computer device 20, which provides a safety measure as the passphrase will not be easily compromised by others that may have access to the computer device 20.

Figure 3:
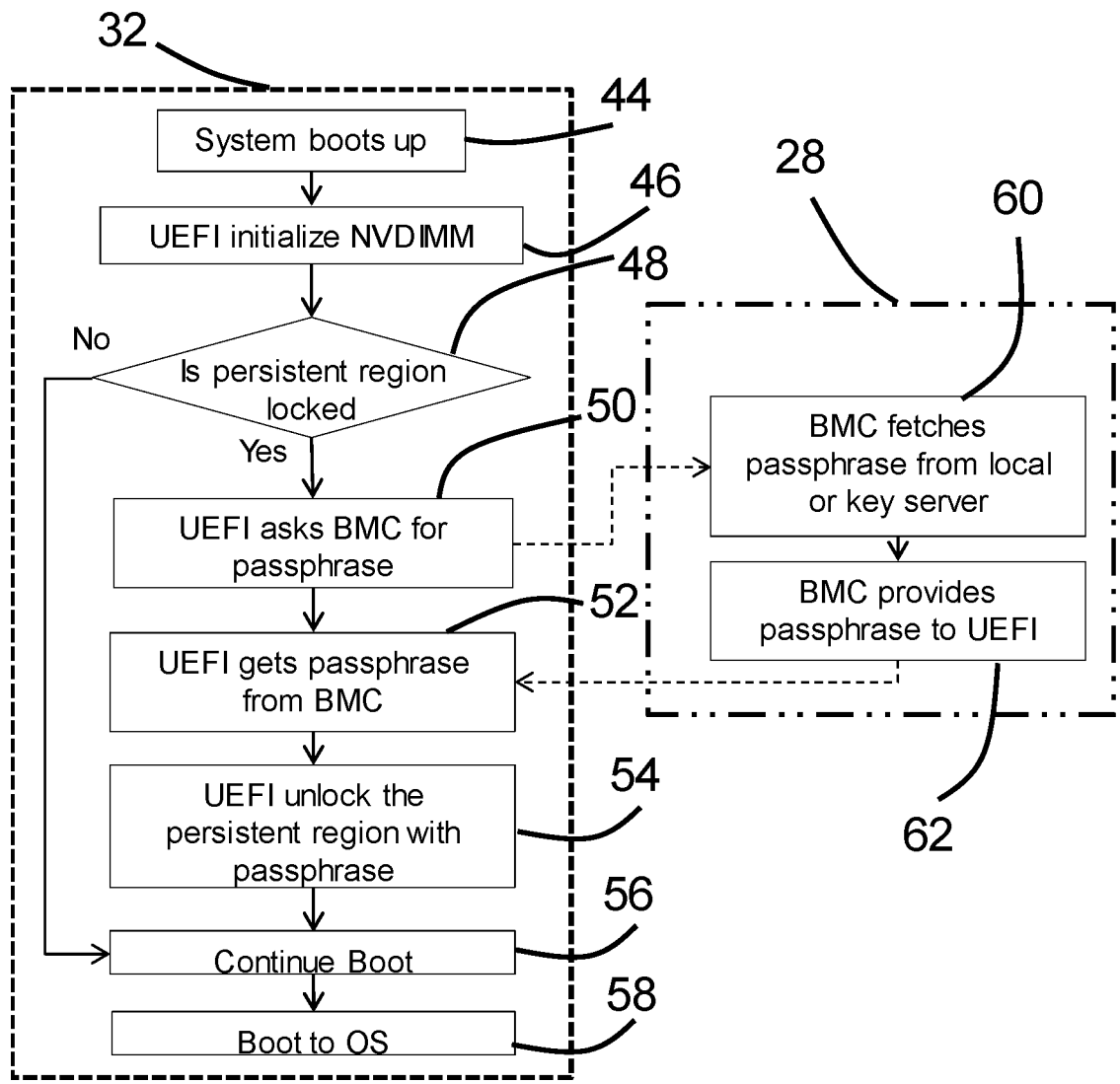
FIG. 3 sets forth a flowchart illustrating an exemplary method of automatically unlocking a locked persistent region in the memory of a computer device according to a further embodiment of the present invention.

Turning to FIG. 3, which shows, according to another embodiment of the present invention, a procedure of an information handling apparatus automatically unlocking a persistent region in a memory of the information handling apparatus. The method shown in FIG. 3 can be for example performed on the computer device shown in FIG. 1, but is not limited only to such computer device. For tease of description, the computer device 20 in FIG. 1 will be referenced to describe an exemplary implementation of the method of FIG. 3. To successfully perform the method in FIG. 3, a passphrase has to be stored in advance, for example, by using the method described above in FIG. 2.

After the computer device 20 boots up in Step 44, in Step 46 the UEFI 32 initializes the NVDIMM 24, including checking for any persistent region allocated in the NVDIMM 24. In this example, there is a persistent region 24a existing in the NVDIMM 24, and in Step 48 the UEFI 32 determines if the persistent region 24a is locked or not. If the persistent region 24a is not locked, then there is no need to perform automatic unlocking, and the method proceeds to Step 56 to continue the normal booting of the computer device 20 and eventually to the booting of the operating system (OS) in Step 58.

However, in Step 48 if it is determined that the persistent region 24a is locked, then the UEFI 32 askes the BMC 28 for the passphrase in Step 50. After the BMC 28 has received the request from the UEFI 32, the BMC 28 fetches the passphrase from the key server 34 in Step 60. The BMC 28 provides the passphrase to the UEFI 32, and the UEFI 32 gets the passphrase from the BMC 28, in Step 52. With the obtained passphrase in Step 52, the UEFI 32 uses this passphrase to unlock the persistent region 24a in Step 54 so that the persistent region 24a can now be used by the computer device 20. The method proceeds to Step 56 to continue the normal booting of the computer device 20 and eventually to the booting of the operating system in Step 58.

Figure 4:
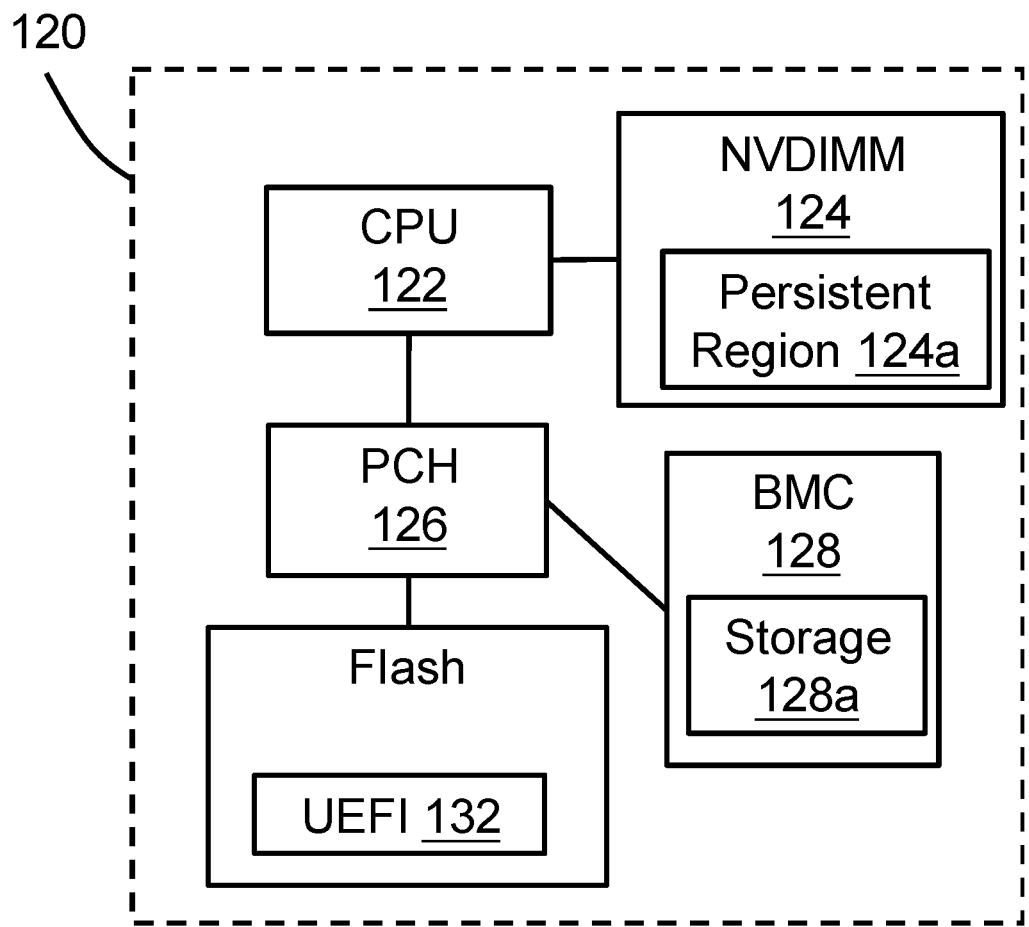
FIG. 4 sets forth an internal component block diagram of another computer device according to a further embodiment of the present invention.

FIG. 4 shows another embodiment of the invention in which a computer device 120 is not connected to any external device (such as the key server 34 in FIG. 1) for storing the passphrase. Rather, the BMC 128 has a specific storage 128a which is a part of the BMC 128 chip for storing data, and the storage 128a is used to save the passphrase for unlocking the persistent region 124a in the NVDIMM 124. The creation and storing of the passphrase, as well as the automatic unlocking using the passphrase on the computer device 120, can be achieved using methods similar to those shown in FIGS. 2-3, but with the difference that the passphrase is saved into the BMC 128, and the UEFI 132 directly obtains the passphrase from the BMC 128. Like the configuration shown in FIG. 1, the computer device 120 also contains the CPU 122 as the main processor installed in a socket of an information handling apparatus, the CPU 122 being connected to the PCH 126 and the NVDIMM 124. The PCH 126 is also connected the BCM 128 and to a memory such as the Flash chip 130 that stores the UEFI 132.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

For the example, in the embodiments mentioned above NVDIMM is described as the main memory of the information handling apparatus for creating the persistent memory region, and in particular the NVDIMM can be Intel® Optane™ DC Persistent Memory Module (DCPMM). However, the invention is not limited to implementation based on NVDIMM. Any other past or future memory type which provides a faster access speed as compared to NAND flash and also provides persistent data storage even after power off could be used to implement the present invention.

In addition, the automatic unlocking method described in the present invention can be implemented on any type of information handling apparatus, although a computer device is used as an example above to explain the methods. One skilled in the art will recognize that various types of processors (and multiple processors on a same motherboard) may be used with the present invention. For example, the number of CPUs in the information handling apparatus could be 1, 2, 4, 8, 16, and each one of the CPUs may be connected with their respective NVDIMM(s). As skilled persons will understand, a single persistent region may be created by interleaving multiple physical NVDIMMs and this allows the creation of a single, virtual disk drive. The present invention is particularly useful to interleaved NVDIMM because a single passphrase can be used to unlock such persistent region without having to individually unlock the NVDIMMs separately.

The methods described above in FIGS. 2 and 3 are carried about by the UEFI and the BMC in the computer device. However, it should be noted that such methods may be carried out by any computer program containing program instructions embodied on a transitory or non-transitory computer readable storage medium, and such program instructions when executed by a processor cause the processor to perform the methods. For instance, in a variation of the invention, all method steps in FIGS. 2 and 3 may be carried out by the UEFI alone, which means that the passphrase is also saved in the Flash chip in which the UEFI resides, such as a Serial Peripheral Interface (SPI) flash chip. Alternatively, all method steps in FIGS. 2 and 3 may be carried out by the BMC of the computer device only. Furthermore, the roles of the BMC and the UEFI in performing steps of the methods illustrated in FIGS. 2 and 3 may be swapped.

What is claimed is:

1. A method for unlocking a persistent region in a memory of an information handling apparatus, the method comprising:
during a boot process of the information handling apparatus, automatically performing:
configuring a firmware of the information handling apparatus to determine whether the persistent region in the memory is locked;
when the persistent region is locked, instructing a controller of the information handling apparatus to obtain a stored passphrase from a storage device, wherein the controller and the storage device are external to the memory; and
using the passphrase to unlock the persistent region in the memory of the information handling apparatus.

2. The method according to claim 1, wherein the firmware is a unified extensible firmware interface (UEFI).

3. The method according to claim 1, further comprising:
accessing, by the controller, the storage device for the passphrase; and
returning, by a processor of the information handling apparatus, the passphrase to the firmware.

4. The method according to claim 3, wherein the controller is a baseboard management controller (BMC) of the information handling apparatus.

5. The method according to claim 1, wherein the persistent region is formed in a non-volatile dual in-line memory module (NVDIMM).

6. The method according to claim 5, wherein the persistent region is interleaved on a plurality of NVDIMMs.

7. The method according to claim 1, wherein the storage device is at least one of a local server and a remote server connected to the information handling apparatus.

8. The method according to claim 1, wherein the storage device is formed as part of a baseboard management controller (BMC) of the information handling apparatus.

9. The method according to claim 1, further comprising, prior to determining, by the firmware, whether the persistent region in the memory is locked, storing the passphrase to the storage device.

10. The method according to claim 9, wherein storing the passphrase to the storage device further comprises:
receiving the passphrase from a user input;
setting the passphrase to the persistent region in the memory of the information handling apparatus; and
saving the passphrase to the storage device.

11. An information handling apparatus, comprising:
a controller;
a memory coupled to the controller, the memory having a persistent region that can either be locked or unlocked; and
a firmware configured to, automatically during a boot process of the information handling apparatus:
determine whether the persistent region of the memory is locked;
instruct the controller to obtain a stored passphrase from a storage device when the persistent region is locked, wherein the controller and the storage device are external to the memory; and
use the passphrase to unlock the persistent region of the memory.

12. The information handling apparatus according to claim 11, wherein the firmware is a unified extensible firmware interface (UEFI).

13. The information handling apparatus according to claim 11, wherein the controller is a baseboard management controller (BMC).

14. The information handling apparatus of claim 13, wherein the storage device is formed as part of the BMC.

15. The information handling apparatus according to claim 11, wherein the persistent region is formed in a non-volatile dual in-line memory module (NVDIMM).

16. The information handling apparatus according to claim 11, wherein the persistent region is interleaved on a plurality of NVDIMMs.

17. The information handling apparatus according to claim 11, wherein the storage device is at least one of a local server and a remote server connected to the information handling apparatus.

* * * * *